UNITED STATES PATENT OFFICE.

CHRISTIAN RUDOLPH, OF OFFENBACH-ON-THE-MAIN, GERMANY, ASSIGNOR TO THE FIRM OF K. OEHLER, OF SAME PLACE.

OXYQUINOLIN AZO DYE.

SPECIFICATION forming part of Letters Patent No. 558,613, dated April 21, 1896.

Application filed November 13, 1895. Serial No. 568,812. (Specimens.)

*To all whom it may concern:*

Be it known that I, CHRISTIAN RUDOLPH, chemist, doctor of philosophy, residing at Offenbach-on-the-Main, Germany, have invented new and useful Improvements in and Relating to a New Red-Blue Oxyquinolin Azo Dyestuff and the Production of It, of which the following is a specification.

Coloring-matters resulting from the combination of ortho and para oxyquinolin with either diazotized bases—as, for instance, anilin, paratoluidin, parabromanilin, and beta-naphthylamin—or with diazobenzosulfo-acids have already been obtained and described in literature, (see *Berichte der Deutschen Chemischen Gesellschaft,* 1881, page 2,573; 1884, page 1,642; 1888, page 1,642;) but up to the date of this invention no dyes of commercial value have been obtained from oxyquinolins or their homologues, and all efforts to find a useful technical application in the dyestuff industry have hitherto been unsuccessful.

Now I have succeeded in producing valuable violet to blue tetrazo dyestuffs from the isomeric oxyquinolins and their homologues by combining them with the intermediate products from paradiamins and $alpha_1$-$alpha_4$-amidoöxynaphthalene-$beta_2$-$beta_3$-disulfo-acid.

The new dyestuffs distinguish by very clear shades and their fastness to light.

In the following example I shall describe the manner in which the formation takes place. By parts are meant parts by weight. The intermediate product obtained in the usual way from twelve and one-fifth (12.2) parts of dianisidin and seventeen (17) parts of the acid sodium salt of $alpha_1$-$alpha_4$-amidoöxynaphthalene-$beta_2$-$beta_3$-disulfo-acid is poured into an alkaline solution of seven and a half (7.5) parts of paraoxyquinolin. Then the whole is allowed to stand for some hours, the mass heated, salted out, filtered, pressed, and dried.

The dyestuff thus obtained forms a greenish-brown powder with a metallic luster, which is soluble in water to a blue and in strong sulfuric acid to a pure green-blue solution, and dyes unmordanted cotton reddish blue.

Now what I claim as new, and desire to secure by Letters Patent, is—

1. The process of making a new red-blue tetrazo dyestuff consisting in first combining dianisidin with the sodium salt of $alpha_1$-$alpha_4$-amidoöxynaphthalene-$beta_2$-$beta_3$-disulfo-acid and afterward combining with this intermediate product an alkaline solution of paraoxyquinolin, substantially as described.

2. As a new article of manufacture, the red-blue coloring-matter herein described derived from dianisidin, $alpha_1$-$alpha_4$-amidoöxynaphthalene-$beta_2$-$beta_3$-disulfo-acid, and paraoxyquinolin, and which is characterized by the following properties: it forms a greenish-brown powder of a metallic luster which is soluble in water to a blue and in strong sulfuric acid to a pure green-blue solution and dyes unmordanted cotton reddish blue, all substantially as hereinbefore described.

In testimony whereof I have signed my name to this specification in the presence of two subscribing witnesses.

CHRISTIAN RUDOLPH.

Witnesses:
JEAN GRUND,
ALVESTO S. HOGUE.